United States Patent
Nguyen (10) Patent No.: US 9,246,749 B1
(45) Date of Patent: Jan. 26, 2016

(54) METHOD FOR AUTOMATIC RECOVERY OF LOST COMMUNICATIONS FOR UNMANNED GROUND ROBOTS

(71) Applicant: Hoa Gia Nguyen, San Diego, CA (US)

(72) Inventor: Hoa Gia Nguyen, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 387 days.

(21) Appl. No.: 13/689,545

(22) Filed: Nov. 29, 2012

(51) Int. Cl.
*G05D 1/02* (2006.01)
*H04L 12/24* (2006.01)

(52) U.S. Cl.
CPC ............ *H04L 41/0654* (2013.01); *G05D 1/028* (2013.01)

(58) Field of Classification Search
CPC .......................... G05D 1/0022; G05D 1/028
See application file for complete search history.

(56) References Cited

U.S. PATENT DOCUMENTS

| | | | |
|---|---|---|---|
| 5,465,525 A * | 11/1995 | Mifune et al. | 43/132.1 |
| 6,429,617 B1 * | 8/2002 | Sano et al. | 318/560 |
| 8,108,092 B2 | 1/2012 | Phillips et al. | |
| 2008/0086241 A1 * | 4/2008 | Phillips et al. | 701/2 |
| 2012/0166024 A1 * | 6/2012 | Phillips et al. | 701/2 |
| 2012/0185091 A1 | 7/2012 | Field et al. | |
| 2012/0239191 A1 * | 9/2012 | Versteeg et al. | 700/246 |

OTHER PUBLICATIONS

Unpublished, U.S. Appl. No. 13/470,850, System and Method for Remotely-Operated Deployment and Retrieval of Communication Relays, Navy Case 101287, filed May 14, 2012.
Pezeshkian, Narek et al.; Unmanned Ground Vehicle Radio Relay Deployment System for Non-Line-of-Sight Operations, IASTED Robotics and Applications, Aug. 2007.
Ahuja, Gaurav et al.; Development and demonstration of autonomous behaviors for urban environment exploration; Proc. SPIE 8387, Unmanned Systems Technology XIV, 838718 (May 1, 2012).

* cited by examiner

*Primary Examiner* — Khoi Tran
*Assistant Examiner* — Ryan Rink
(74) *Attorney, Agent, or Firm* — Kyle Eppele; J. Eric Anderson; SPAWAR System Center Pacific (57) ABSTRACT

A lost communications link recovery method for a remotely-operated robot comprising the following steps: monitoring command and control (C2) signals transmitted over a wireless network from an operator control unit (OCU) to the robot; storing the C2 signals in a sliding window buffer; monitoring the wireless network for communication link breaks between the OCU and the robot; and creating, and issuing to the robot, reverse C2 commands based on the stored C2 signals upon detecting a communication link break.

16 Claims, 6 Drawing Sheets

METHOD FOR AUTOMATIC RECOVERY OF LOST COMMUNICATIONS FOR UNMANNED GROUND ROBOTS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101908.

BACKGROUND OF THE INVENTION

The radio communication link between a remotely-operated robot and the operator can be broken in a number of ways. For example, the robot could travel beyond the range of the radio link, the robot could go behind an obstacle that shields the radio signal, the robot could execute a maneuver that results in an unfavorable orientation of the antenna, and/or the robot could move a manipulator arm or payload in such a way as to block the radio signal. When the radio link is broken the operator may lose control of the robot. In order to regain control, the operator must change his/her position to re-establish the radio link. In first responder and/or military applications, re-positioning the operator may expose the operator to unsafe conditions. Some remotely-operated robots have "retro-traverse" capabilities which allow the robot to return home automatically if the radio link is lost by using waypoint navigation or Simultaneous Localization and Mapping. There is a need for a simple method for re-establishing a radio communication link between a remotely-operated robot and an operator.

SUMMARY

Described herein is a lost communications link recovery method for a remotely-operated robot. The first step of the recovery method involves monitoring command and control (C2) signals transmitted over a wireless network from an operator control unit (OCU) to the robot. The next steps involve storing the C2 signals in a sliding window buffer and monitoring the wireless network for communication link breaks between the OCU and the robot. Another step of the recovery method involves creating, and issuing to the robot, reverse C2 commands based on the stored C2 signals upon detecting a communication link break.

Another embodiment of the recovery method for restoring wireless network connectivity between a remotely-operated robot and an operator control unit (OCU) is also disclosed herein. In this embodiment, the recovery method comprises the following steps: monitoring command and control (C2) signals transmitted to the robot over the wireless network from the OCU; executing the C2 signals; storing the C2 signals in a sliding window buffer such that when a new C2 signal is received and stored the oldest stored C2 signal is purged from the buffer; monitoring the wireless network for communication link breaks between the OCU and the robot. Upon detecting a communication link break the following steps are performed: resuming normal operations if the communication link is reestablished before the end of a predefined period, and creating and executing reverse C2 commands based on the stored C2 signals if the communication link is not reestablished before the end of the predefined period.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
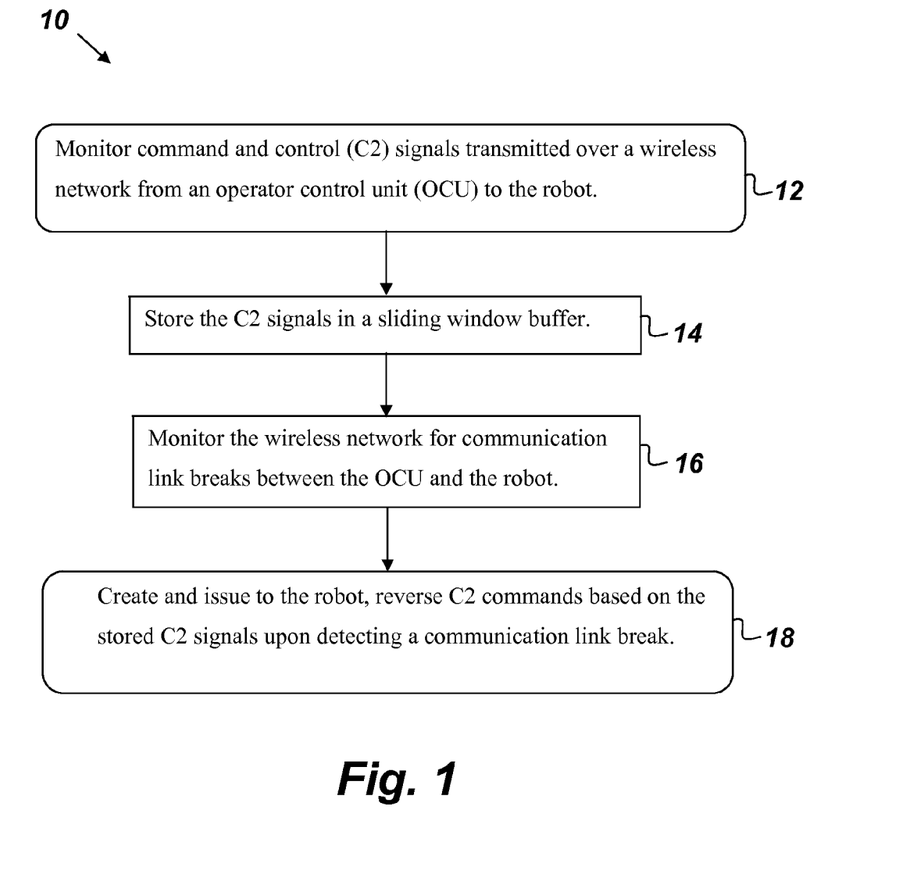
FIG. 1 is a flowchart of a method for recovering a lost communication link between a remotely-operated robot and an operator control unit.

FIG. 1 is a flowchart depicting a method 10 for recovering a lost communication link between a remotely-operated robot and an operator control unit (OCU). The first step 12 provides for monitoring command and control (C2) signals transmitted over a wireless network from an operator control unit (OCU) to the robot. The second step 14 provides for storing the C2 signals in a sliding window buffer. The third step 16 provides for monitoring the wireless network for communication link breaks between the OCU and the robot. The fourth step 18 provides for creating, and issuing to the robot, reverse C2 commands based on the stored C2 signals upon detecting a communication link break.

Figure 2:
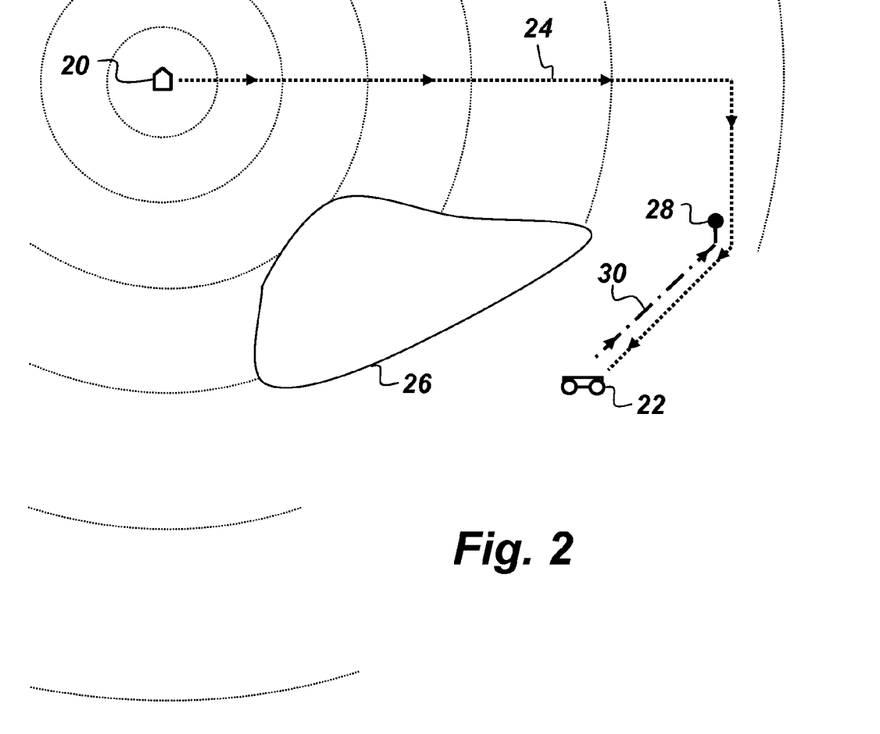
FIG. 2 is an illustration of an example implementation of the communication link recovery method.

FIG. 2 is a pictorial representation of an example implementation of the recovery method 10. In the embodiment shown, an OCU 20 wirelessly transmits C2 signals to a remotely-operated, land-based robot 22. In response to receiving the C2 signals, the robot 22 moves over the terrain. The dotted line 24 represents the path the robot 22 takes in response to following the C2 commands from the OCU 20. The left column of Table 1, shown below, lists an example set of C2 commands that correlates with the movement of the robot in FIG. 2. These C2 commands are stored in the robot 22 a sliding window buffer of a predetermined size.

TABLE 1

| C2 Signals | Reverse C2 Commands |
| --- | --- |
| Drive forward (10 seconds, ½ speed) | Drive backward (10 seconds, ½ speed) |
| Right forward turn (90°) | Left backing turn (90°) |
| Drive forward (3 seconds, ½ speed) | Drive backward (3 seconds, ½ speed) |
| Right forward turn (45°) | Left backing turn (45°) |
| Drive forward (4 seconds, ½ speed) | Drive backward (4 seconds, ½ speed) |

As shown in FIG. 2, as the robot 22 moves around an obstacle 26, the communication link with the OCU 20 is broken. Once it is determined that the communication link is broken, reverse C2 commands are created based on the stored C2 signals in the sliding window buffer. The communication link break may be determined by the absence of a regular "heart beat" signal, absence of valid command signal checksums, a loss of a carrier signal, and/or other means. The right column of Table 1 includes an example list of reverse C2 commands based on the stored C2 signals in the left column. To restore the communication link, the robot 22 begins to execute the reverse C2 commands, starting with the last, until all the reverse C2 commands are executed or the communication link is restored. The step of issuing reverse C2 commands is repeatedly performed, addressing stored commands further back in the sliding window buffer, until the buffer is empty or the communication link has been re-established. In one embodiment, the reverse C2 command can reverse the operation of a series of stored C2 commands as a single operation.

In the example shown in FIG. 2, the communication link is restored once the robot 22 reemerges from behind the obstacle 26; this location is represented in FIG. 2 as circle 28. In this example, the robot 22 issues the last two reverse C2 commands and a portion of third-to-the-last reverse C2 command before the communication link is reestablished. The dot-dashed line 30 represents the path taken by the robot 22 in response to following the reverse C2 commands.

Figure 3:
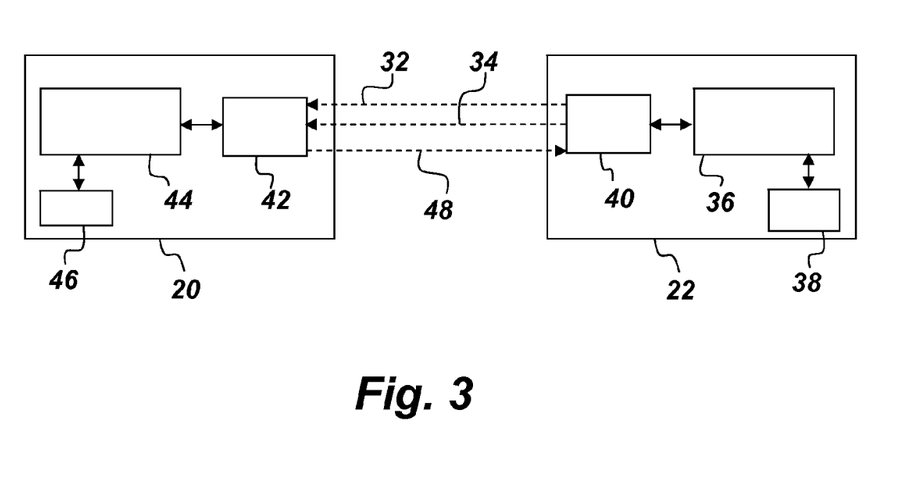
FIG. 3 is a block diagram illustrating the interaction between a remotely operated vehicle and an operator control unit.
Figure 6:
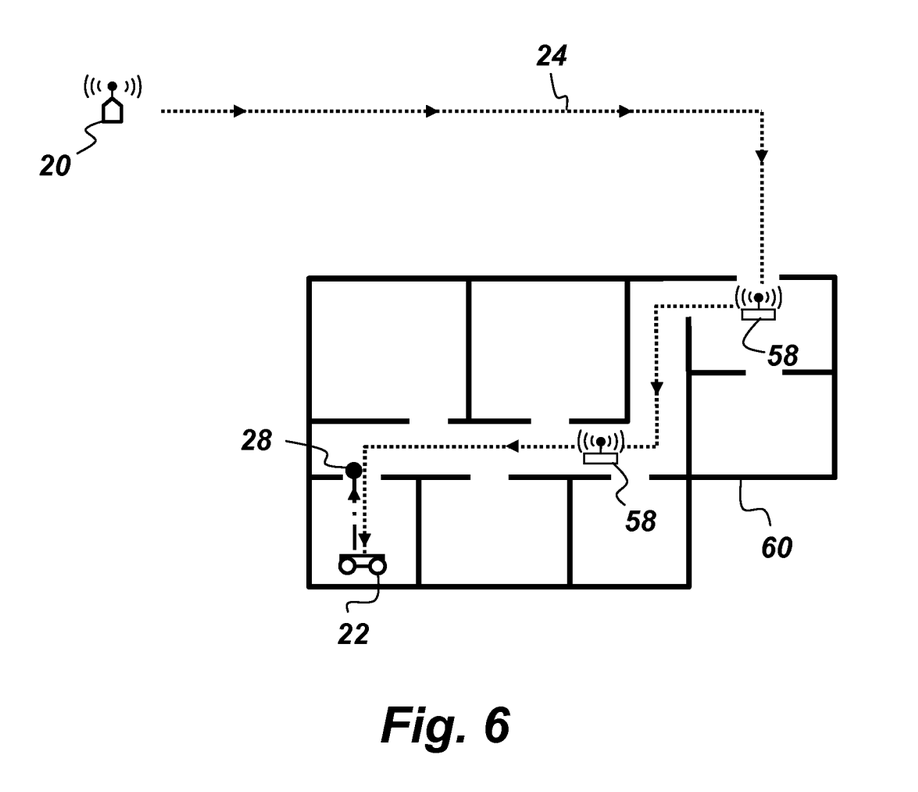
FIG. 6 is an illustration of another example implementation of the communication link recovery method.

FIG. 3 depicts an embodiment of wireless video and data links between the robot 22 and its OCU 20. Video signals 32 and status signals 34 originate from an internal robot processor 36 and one or more video cameras 38 respectively. The video and status signals 32 and 34 are routed through a robot radio 40 and are wirelessly transmitted to an OCU radio 42, where they are in turn passed onto an OCU processor 44 and OCU screen 46. The robot radio 40 handles protocol traffic on the wireless link. The C2 signals 48 originate from the OCU processor 44, go through the OCU radio 42, are transmitted wirelessly to the robot radio 40, and finally arrive at the robot's internal processor 36. The robot processor 36 then executes those C2 commands. The wireless communication link between the OCU 20 and the robot 22 can be either direct or through one or more relays, such as is shown in FIG. 6. The C2 signals can command the robot 22 to perform any desired function including, but not limited to, moving forward, moving backward, turning, and changing the position and angle of one or more flippers or manipulators. These commands can cause the wireless link to the robot 22 to be broken. Creating and issuing reverse C2 command effectively cause the robot 22 to counteract the C2 commands, allowing the robot 22 to automatically move back to a location and/or configuration where the wireless communication link is again established.

Figure 4A:
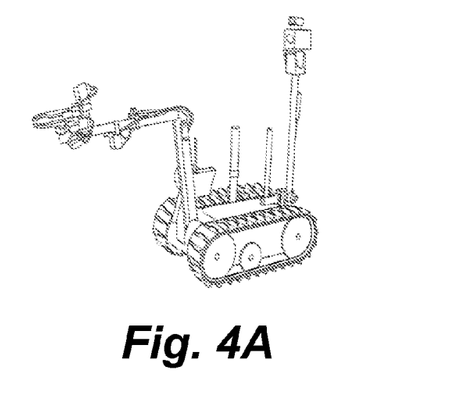
FIGS. 4A-4D are illustrations of various ground robots with which the communication link recovery method may be used.
Figure 4B:
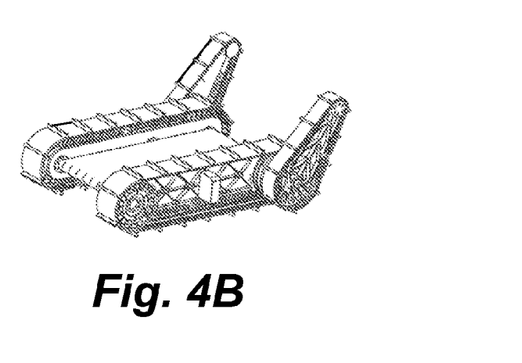
Figure 4C:
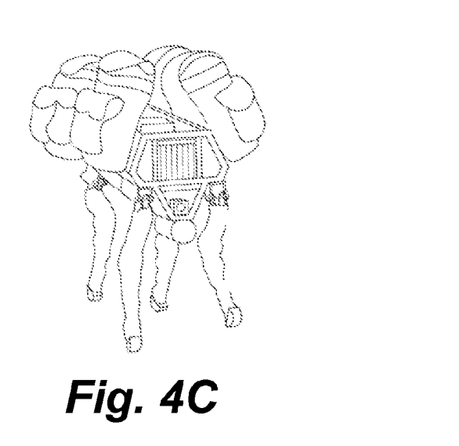
Figure 4D:
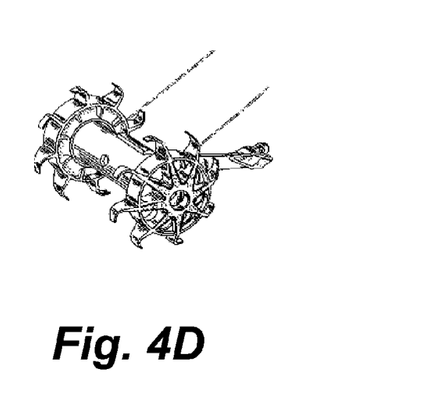

The robot 22 may be any tele-operated, land-based robot of any size or shape. FIGS. 4A-4D depict various types of tele-operated robots with which the recovery method 10 may be used. FIG. 4A is a depiction of a tracked robot with a manipulator arm. FIG. 4B is a depiction of a tracked robot with tracked flipper arms. FIG. 4C is a legged, walking robot. FIG. 4D is a wheeled robot. It is to be understood that the robots depicted in FIGS. 4A-4D are examples only and that the recovery method 10 may be used with any ground-based, tele-operated robot.

Figure 5A:
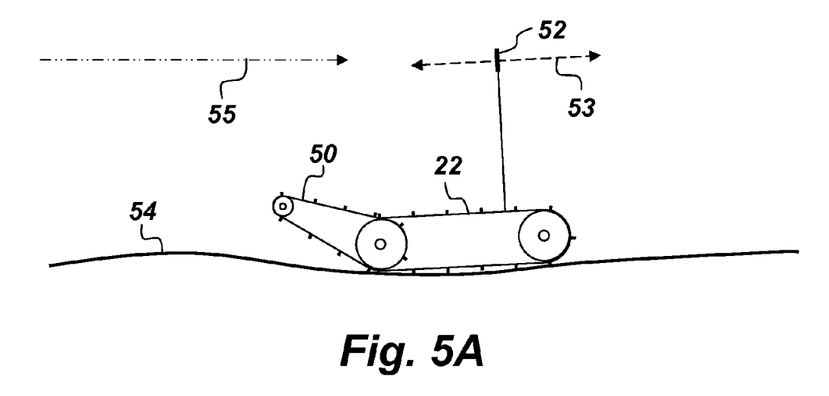
FIGS. 5A-5B are depictions of an embodiment of a ground robot in various positions.
Figure 5B:
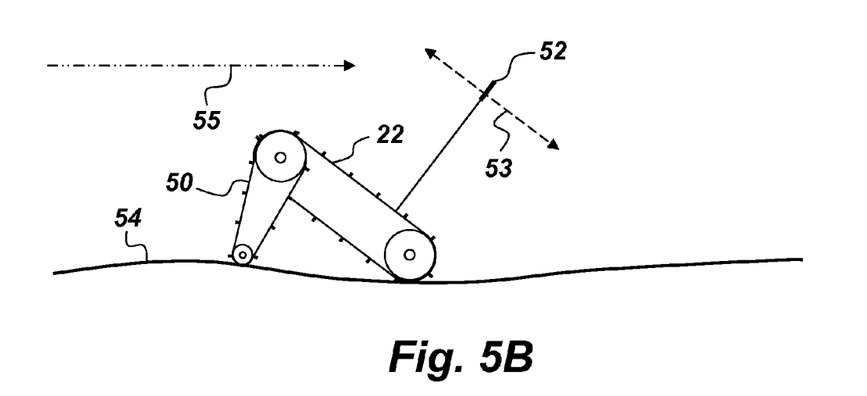

FIGS. 5A-5B are depictions of an embodiment of the robot 22, which has flippers 50 and antenna 52. In FIG. 5A, the antenna 52 has a sensitivity/gain/radiation pattern 53 that is, for the most part, aligned with the incoming radiation 55, represented by the dot-dot-dash line, from the OCU 20, which includes the C2 signals 48. A typical shape of the radiation pattern 53 of the vertical antenna 52 is a somewhat flattened toroid centered around the antenna 52. In its position on the ground 54, as shown in FIG. 5A, the robot 22 is able to receive the C2 signals 48. FIG. 5B illustrates how a simple maneuver such as raising the robot 22 on its flippers 50 could be enough to break the communication link with the OCU 20. As shown in FIG. 5B, the directions of the incoming radiation 55 from the OCU 20 and the radiation pattern 53 of the antenna 52 are mismatched. In other words, the most sensitive directions of the antenna 52 to incoming radiation 55 (also where it radiates the strongest) do not point towards the OCU 20, which could result in a break in the communications link. In the event of a communications link break, if the last C2 signal stored in the sliding window buffer was to raise the robot 22 on its flippers 50, the recovery method 10 would issue reverse C2 commands to the robot 22 to lower itself back down on its flippers 50—thus re-aligning the radiation pattern 53 with the incoming radiation 55. The OCU 20 may be any vehicle-operator control interface capable of controlling a tele-operated, ground vehicle.

FIG. 6 depicts the recovery method 10 being used in conjunction with radio relays 58 as the robot 22 maneuvers through different rooms of a building 60. In this embodiment, the robot 22 traveling from the OCU 20 toward the building 60 maintains LOS communications with the OCU 20. However, as the robot 22 begins to travel into the building 60, radio communications begin to be obstructed. FIG. 6 shows how a radio relay 58 may be placed in the vicinity of the entrance to the building 60 and at other locations inside the building 60 to allow the robot 22 to continue into the building 60 without losing radio connectivity with the OCU 20. As shown in FIG. 6, if the robot 22 runs out of radio relays 58 to deploy, the recovery method 10 may be used to reestablish connectivity with the OCU 20. In this case as the robot 22 moves into a far room it moves out of range of the last radio relay 58, at which point the recovery method 10 would then issue reverse C2 commands based on the C2 commands in the sliding window buffer to allow the robot 22 to retrace its steps until it reaches a location, represented by location circle 28, where communication with the OCU 20 via the radio relays 58 is reestablished.

The step of creating and issuing reverse C2 commands can be accomplished by the computer that resides in the robot radio 40 itself, or by the robot's internal processor 36, without any additional sensor input. The sliding window buffer is configured to store a copy of the last few seconds of commands from the OCU. As new data comes in from one end, old data is dropped off at the other end. Upon detection of a broken wireless link, it may be desirable to wait a predefined period of time to see if the link re-establishes by itself before initiating reverse C2 commands. The predefined period of time must be long enough to allow the communications link to reestablish itself in the event of a temporary break. There can be momentary breaks in the wireless link as the robot 22 travels, which could be caused just by the bouncing motion of the robot 22 over rough terrain and the associated movements of the antenna. The predefined period of time can be anywhere from a few seconds long to tens of seconds long. For example, a suitable value for the predefined time period is 10 seconds long. If the link is still broken after this waiting period, the computer (either the internal processor 36 or the computer in the robot radio 40) would examine the last few commands in the sliding window buffer and automatically create and issue reverse commands. For example, if the last C2 command was a forward movement of certain duration, the reverse C2 command would be a backward movement command of the same duration. If the last C2 command was a left-forward turn, the reverse C2 command would be a right-reverse turn command. If the last C2 command was a raise-the-manipulator command, the reverse C2 command would be a lower-manipulator command.

If undoing one command does not restore the wireless link, the radio computer (or internal processor 36) would keep on undoing the next several commands in the sliding window buffer, one at a time, until the buffer is empty or the link is restored. Through experimentation, it may be found that it may be more efficient for a combination of commands to be reversed at the same time, or that a different command may undo the effect of a past command that may not be intuitive. In any case, the recovery method 10 is capable of restoring the communication link between the OCU 20 and the robot 22 solely through the examination of the past C2 commands, and not through external sensors such as GPS receivers, laser, video camera, gyroscopes, inertial measurement units, etc. In other words, the recovery method 10 does not rely on optical imaging, space-based-satellite-navigation-system sensors, waypoint navigation, and/or maps to reestablish the communication link.

However, additional sensors such as GPS receivers, laser, video camera, gyroscopes, inertial measurement units, etc. may be used in conjunction with the recovery method 10 to improve the performance. For example, a gyroscope may allow the internal processor 36 (or the computer in the robot radio 40) to determine if the robot 22 has flipped over. If so, backing up the robot 22 will not help. If the internal processor 36 (or the computer in the robot radio 40) determines that the robot 22 is indeed not right-side-up, then the recovery method 10 can instruct the robot 22 to perform self-righting maneuvers and to position itself in an orientation that is substantially equal to its orientation just before the communication link break. In the embodiment of the recovery method 10 wherein the processing steps are performed by the robot radio 40 itself the functionality of the recovery method 10 can be built into standalone radio systems that can be mounted on different robots, without having to modify the software on the internal processor 36 of the robot 22 itself.

From the above description of the recovery method 10, it is manifest that various techniques may be used for implementing the concepts of method 10 without departing from its scope. The described embodiments are to be considered in all respects as illustrative and not restrictive. It should also be understood that method 10 is not limited to the particular embodiments described herein, but is capable of many embodiments without departing from the scope of the claims.

I claim:

1. A lost communications link recovery method for a remotely-operated robot comprising the following steps:
   receiving command and control (C2) signals transmitted over a wireless network from an operator control unit (OCU) to the robot, wherein the C2 signals comprise movement instructions for the robot;
   issuing received C2 signals to the robot;
   storing past C2 signals in a sliding window buffer;
   monitoring the wireless network for communication link breaks between the OCU and the robot;
   creating, and issuing to the robot, reverse C2 commands based on the stored C2 signals upon detecting a communication link break, wherein the reverse C2 commands are opposites of the stored C2 signals that are issued to the robot on a last-in-first-out basis until the communication link is restored or the sliding window buffer is empty; and
   wherein the above steps are performed by a radio processor inside a radio receiver without the aid of external environmental characteristic sensors, and wherein the radio receiver is mounted to the robot and is electronically connected to an internal processor inside the robot.

2. The method of claim 1, further comprising the steps of:
   waiting a predefined period of time after detecting a communication link break;
   resuming normal operations if the communication link is reestablished before the end of the predefined period; and
   creating the reverse C2 commands only if the communication link has not been reestablished by the end of the predefined time period.

3. The method of claim 2, wherein the predefined time period is greater than two seconds and less than 20 seconds.

4. The method of claim 1, wherein the steps performed by the radio processor are performed without modifying software residing on the robot's internal processor.

5. The method of claim 4, wherein the steps performed by the radio processor are performed without modifying software residing on the OCU.

6. The method of claim 1, wherein the reverse C2 commands are based solely on the past C2 signals.

7. The method of claim 1, wherein no optical imaging or space-based-satellite-navigation-system sensors are used to reestablish the communication link.

8. The method of claim 1, wherein no way-point navigation is used to reestablish the communication link.

9. The method of claim 1, wherein no maps are used to reestablish the communication link.

10. The method of claim 1, further comprising the steps of
   determining if the robot is right-side up after detecting a communication link break; and
   if the robot is determined not to be right-side up, performing the following steps before issuing reverse C2 commands:
      performing self-righting maneuvers by the robot, and
      positioning the robot such that its orientation is substantially equal to its orientation just before the communication link break.

11. A method for restoring wireless network connectivity between a remotely-operated robot and an operator control unit (OCU) comprising the following steps performed by a radio processor inside a radio receiver without the aid of external environmental characteristic sensors:
   receiving command and control (C2) signals transmitted to the robot over the wireless network from the OCU, wherein the C2 signals comprise movement instructions for the robot;
   issuing the received C2 signals to the robot to execute;
   storing the received C2 signals in a sliding window buffer such that when a new C2 signal is received and stored the oldest stored C2 signal is purged from the buffer;
   monitoring the wireless network for communication link breaks between the OCU and the robot; and
   performing the following steps upon detecting a communication link break:
      resuming normal operations if the communication link is reestablished before the end of a predefined period,
      creating reverse C2 commands based on the stored C2 signals if the communication link is not reestablished before the end of the predefined period, wherein the reverse C2 commands comprise opposite movement instructions to the stored C2 signals, and
      issuing the reverse C2 commands to the robot to execute on a last-in-first-out basis, such that the reverse C2 command corresponding to the newest stored C2 signal is issued to the robot first, until the communication link is restored or the sliding window buffer is empty.

12. The method of claim 11, wherein no optical imaging or space-based-satellite-navigation-system sensors are used to reestablish the communication link.

13. The method of claim 11, further comprising the steps of:
- determining if the robot is right-side up after the robot detects a break in the communication link; and
- if the robot is determined not to be right-side up, performing the following steps before issuing reverse C2 commands:
  - performing self-righting maneuvers by the robot, and
  - positioning the robot such that its orientation is substantially equal to its orientation just before the communication link break was detected.

14. A lost communications link recovery method for a remotely-operated robot comprising the following steps:
1.) receiving wirelessly-transmitted command and control (C2) signals from an operator control unit (OCU) with a radio receiver mounted to the robot, wherein the C2 signals comprise movement instructions for the robot, and wherein the radio receiver performs the following steps;
  a.) relaying the received C2 signals to an internal processor inside the robot such that the robot executes the movement instructions;
  b.) storing the received C2 signals in a sliding window buffer;
  c.) monitoring a wireless network for communication link breaks between the OCU and the robot;
  d.) upon detecting a communication link break, creating a reverse C2 command that comprises a movement instruction that is opposite of the last-received C2 signal in the sliding window buffer;
  e.) issuing the reverse C2 command to the robot as if the reverse C2 command came from the OCU such that the robot executes the reverse C2 command;
  f.) removing the last-received C2 signal from the sliding window buffer after its corresponding reverse C2 command is issued to the robot; and
  g.) repeating steps (d) through (f) until the communication link is restored or the sliding window buffer is empty.

15. The method of claim 14, further comprising the steps of:
- determining if the robot is right-side up after detecting a break in the communication link; and
- if the robot is determined not to be right-side up, performing the following steps before issuing reverse C2 commands:
  - performing self-righting maneuvers by the robot, and
  - positioning the robot such that its orientation is substantially equal to its orientation just before the communication link break was detected.

16. The method of claim 15 wherein the reverse C2 commands are created based solely on the stored C2 signals in the sliding window buffer without the aid of external environmental characteristic sensors.

* * * * *